United States Patent [19]
Moriyama et al.

[11] Patent Number: 5,692,150
[45] Date of Patent: Nov. 25, 1997

[54] CACHE FLASH CONTROLLING METHOD FOR CACHE MEMORY SYSTEM

[75] Inventors: Shuichi Moriyama; Kazuhisa Iga, both of Niigata, Japan

[73] Assignee: NEC Corporation, Tokyo, Japan

[21] Appl. No.: 508,186

[22] Filed: Jul. 27, 1995

[30]   Foreign Application Priority Data

Jul. 28, 1994   [JP]   Japan .................................. 6-176342

[51] Int. Cl.[6] .................................................. G06F 12/08
[52] U.S. Cl. .................................. 395/462; 395/470
[58] Field of Search .............................. 395/440, 445, 395/462, 471, 472, 470, 455, 622

[56]   References Cited

U.S. PATENT DOCUMENTS

| | | | |
|---|---|---|---|
| 5,155,824 | 10/1992 | Edenfield et al. | 395/471 |
| 5,452,249 | 9/1995 | Miyamoto et al. | 365/185 |
| 5,539,894 | 7/1996 | Webber | 395/455 |

FOREIGN PATENT DOCUMENTS

| | | |
|---|---|---|
| 5-128071 | 5/1993 | Japan . |
| 5-282207 | 10/1993 | Japan . |
| 5-342108 | 12/1993 | Japan . |

*Primary Examiner*—Eddie P. Chan
*Assistant Examiner*—Hiep T. Nguyen
*Attorney, Agent, or Firm*—Foley & Lardner

[57]   ABSTRACT

A cache flash controlling method for a cache memory system of the write back type wherein the time required for discrimination of a dirty line in a flash cycle is reduced and system performances are improved. In the cache controlling method, all lines having tag addresses of a cache memory are divided into a plurality of blocks, and for each of the blocks, a dirty detection bit indicating whether or not a dirty line is present in the block is prepared. For those of the blocks whose data line detection bit indicates presence of no dirty line, lines of the block are invalidated immediately without performing a discrimination operation of a dirty line.

1 Claim, 6 Drawing Sheets

CACHE FLASH CONTROLLING METHOD FOR CACHE MEMORY SYSTEM

BACKGROUND OF THE INVENTION

1. Field of the Invention

This invention relates to a cache flash controlling method for a cache memory system wherein a main storage apparatus is accessed by way of a cache memory.

2. Description of the Related Art

A cache memory system of the type mentioned is shown in FIG. 5. Referring to FIG. 5, the cache memory system shown includes a CPU 1, a cache memory 2 and a main storage apparatus 3. The CPU 1 accesses the main storage apparatus 3 by way of the cache memory. Each cache line of the cache memory system has a clean condition wherein stored contents of the cache memory 2 coincide with stored contents of the main storage apparatus 3, and a dirty condition wherein stored contents of the cache memory 2 do not coincide with stored contents of the main storage apparatus 3. In the dirty condition, new data are present in the cache memory 2 while old data are present in the main storage apparatus 3, and the data in the cache memory 2 are true data.

All stored contents of the cache memory 2 are invalidated by a flash. When a flash occurs with any clean line of the cache memory 2, since true data are present in the main storage apparatus 8, stored contents of the cache memory 2 can be invalidated immediately. However, when a flash occurs with any dirty line of the cache memory 2, since true data are not present in the main storage apparatus 8 but present in the cache memory 2, stored contents of the cache memory 2 must not be invalidated before they are written back into the main storage apparatus 8. Therefore, in a flash cycle, discrimination between a clean line and a dirty line must be performed for all tag addresses of the cache memory 2.

Subsequently, an exemplary one of conventional cache flash controlling methods will be described with reference to FIG. 6. According to the conventional method illustrated in FIG. 6, discrimination of presence or absence of a dirty line is performed sequentially in units of one address for all tag addresses beginning with an address 0000 to another address XXXX. When the line being discriminated is a clean line 4, stored contents at the corresponding address of the cache memory 2 is invalidated immediately, and then the tag address is incremented to allow discrimination of a next line between a clean line and a dirty line. If a dirty line 5 is discriminated during such discrimination, the stored contents on the line are different between the cache memory 2 and the main storage apparatus 3. Consequently, the stored contents at the address of the cache memory 2 are written into the address of the main storage apparatus S, and then the stored contents at the address of the cache memory 2 are invalidated. Thereafter, discrimination of presence or absence of a dirty line is performed for a next tag address.

In this manner, in the conventional controlling method, presence of a dirty line or lines from the address 0000 to the address XXXX can be determined only after discrimination for all tag addresses comes to an end. Therefore, searching must be performed sequentially for all tag addresses in units of one address from the address 0000 to the address XXXX.

With the conventional cache flash controlling method described above, also when no dirty line is involved, discrimination is performed for all tag addresses. Consequently, the conventional cache flash controlling method is disadvantageous in that, when flash cycles occur successively, discrimination of a dirty line must be performed for all tag addresses every time, and much time is required for a flash cycle.

SUMMARY OF THE INVENTION

It is an object of the present invention to provide a cache flash controlling method for a cache memory system of the write back type wherein the time required for discrimination of a dirty line in a flash cycle is reduced and system performances are improved.

In order to attain the object described above, according to the present invention, there is provided a cache flash controlling method for a cache memory system of the write back type, comprising the steps of dividing tag addresses of a cache memory into a plurality of blocks, setting, for each of the blocks, a dirty detection bit indicating whether or not a dirty line is present in the block, discriminating, in a flash cycle, a condition of the dirty detection bit for each of the blocks, and performing a discrimination cycle for a dirty line only for any of the blocks in which a dirty line is present while omitting the discrimination cycle for a dirty line for any of the blocks in which no dirty line is present.

A dirty detection bit for each of the blocks may be set to a flip-flop prepared separately from the cache memory.

In the cache flash controlling method for a cache memory system, for any block whose dirty line detection bit is "off", a discrimination operation of a dirty line at the tag address can be eliminated, and consequently, the time required for a flash cycle can be achieved comparing with that of the conventional cache flash controlling method. The advantage is significant particularly when flash cycles successively occur within a short time, since the probability of appearance of a dirty line is low.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
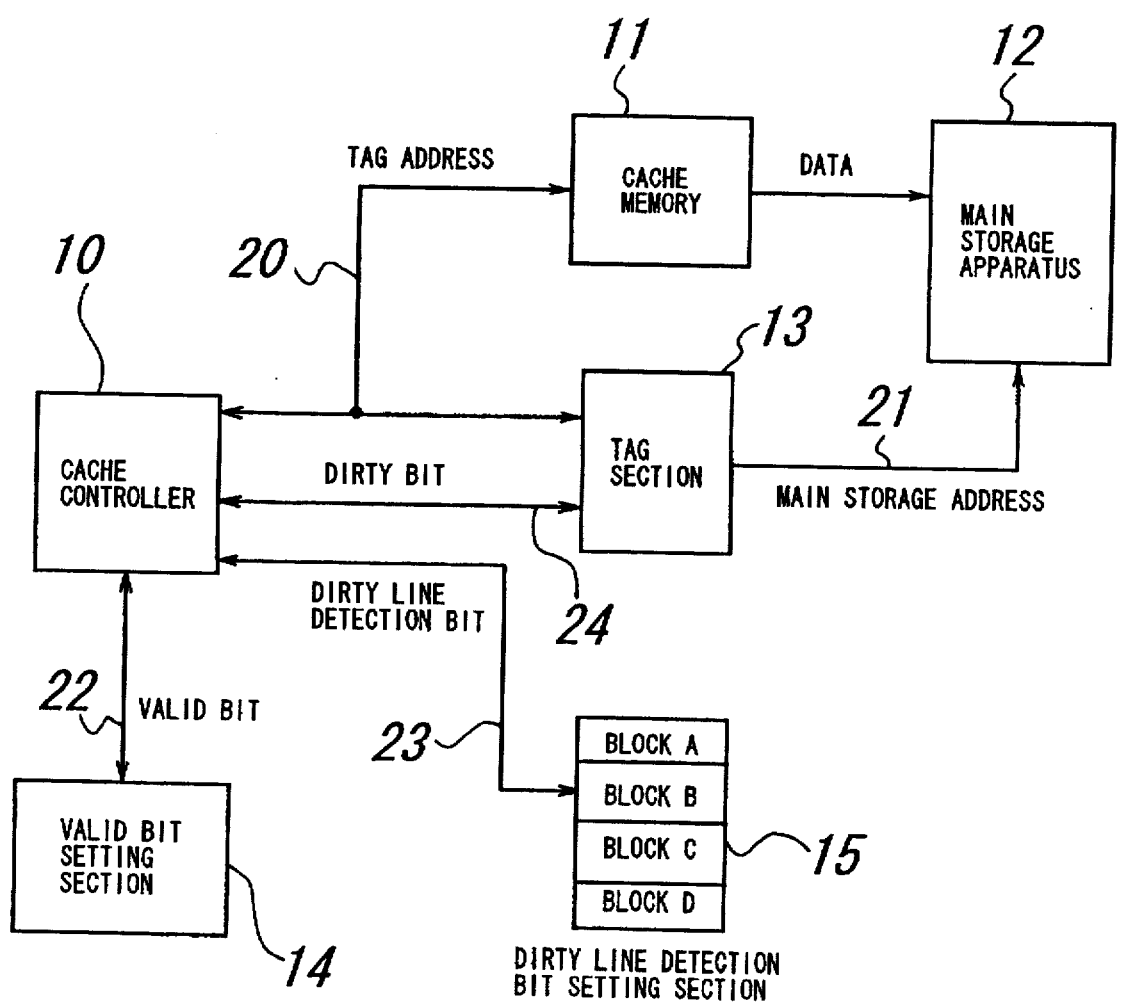
FIG. 1 is a block diagram of a cache memory system in which a cache flash controlling method according to the present invention is employed.

Referring first to FIG. 1, there is shown a cache memory system in which a cache flash controlling method according to the present invention is employed. The cache memory system shown includes a cache controller 10, a cache memory 11, a main storage apparatus 12, a tag section 13 for generating a tag address 20 for the cache memory 11 and a main storage address 21 for the main storage apparatus 12, a VALID bit setting section 14 for setting a VALID bit 22, and a dirty line detection bit setting section 15 for setting a dirty line detection bit 23.

The tag section 13 has a dirty bit 24 provided in units of a line of the cache memory 11 and indicating whether or not the line is dirty, that is, whether the line is a dirty line or a clean line. Further, the tag section 13 divides all tag addresses from an address 0000 to another address XXXX into N blocks. The dirty line detection bit setting section 15 can set, separately for each of the blocks of the tag addresses divided by the tag section 13, a dirty line detection bit 23 for the block. The bit setting section for each block can be formed from a flip-flop.

The dirty bit 24 for each line of the tag section 13 is validated (changed to "on:) by the cache controller 10 upon write hitting upon the line from the CPU. In this Instance, the dirty line detection bit 23 of the block in which the line is included is changed to "on" simultaneously. The dirty line detection bit 23 changed to "on" once does not return to "off" until after a flash cycle for the block is performed.

Figure 2:
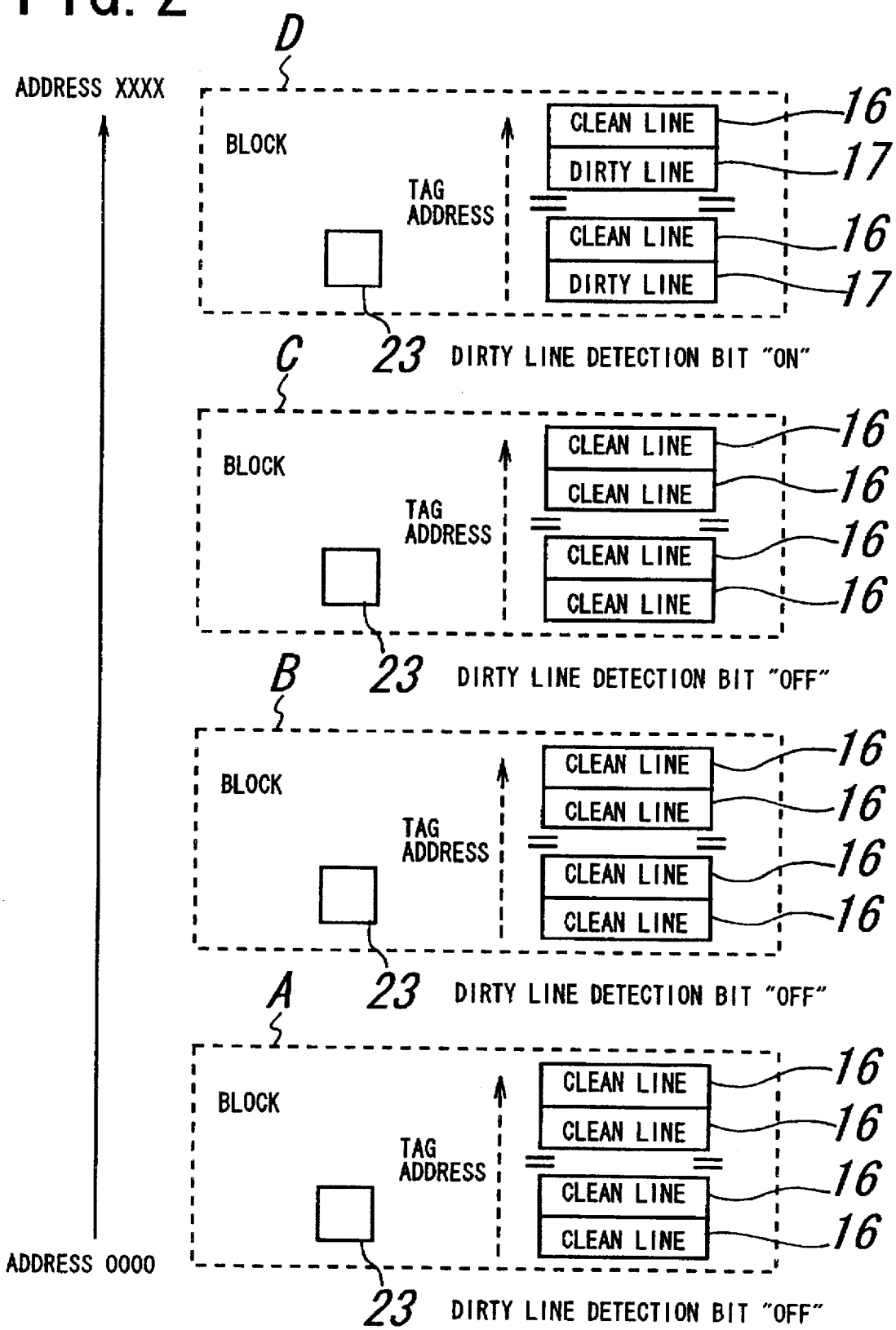
FIG. 2 is a diagrammatic representation illustrating the cache flash controlling method according to the present invention when it is applied where tag addresses are classified into four groups.

Now, the method of the present invention will be described when applied to a case wherein the tag addresses from the address 0000 to the address XXXX is divided into four blocks of a block A, another block B, a further block C and a still further block D as seen in FIG. 2 by the tag section 13.

Referring to FIG. 2, it can be seen that, since all lines included In the blocks A, B and C are clean lines 16, the dirty line detection bits 23 of the three blocks are all "off", but since the block D includes a dirty line 17, the dirty line detection bit 23 of the block D is "on".

Figure 3:
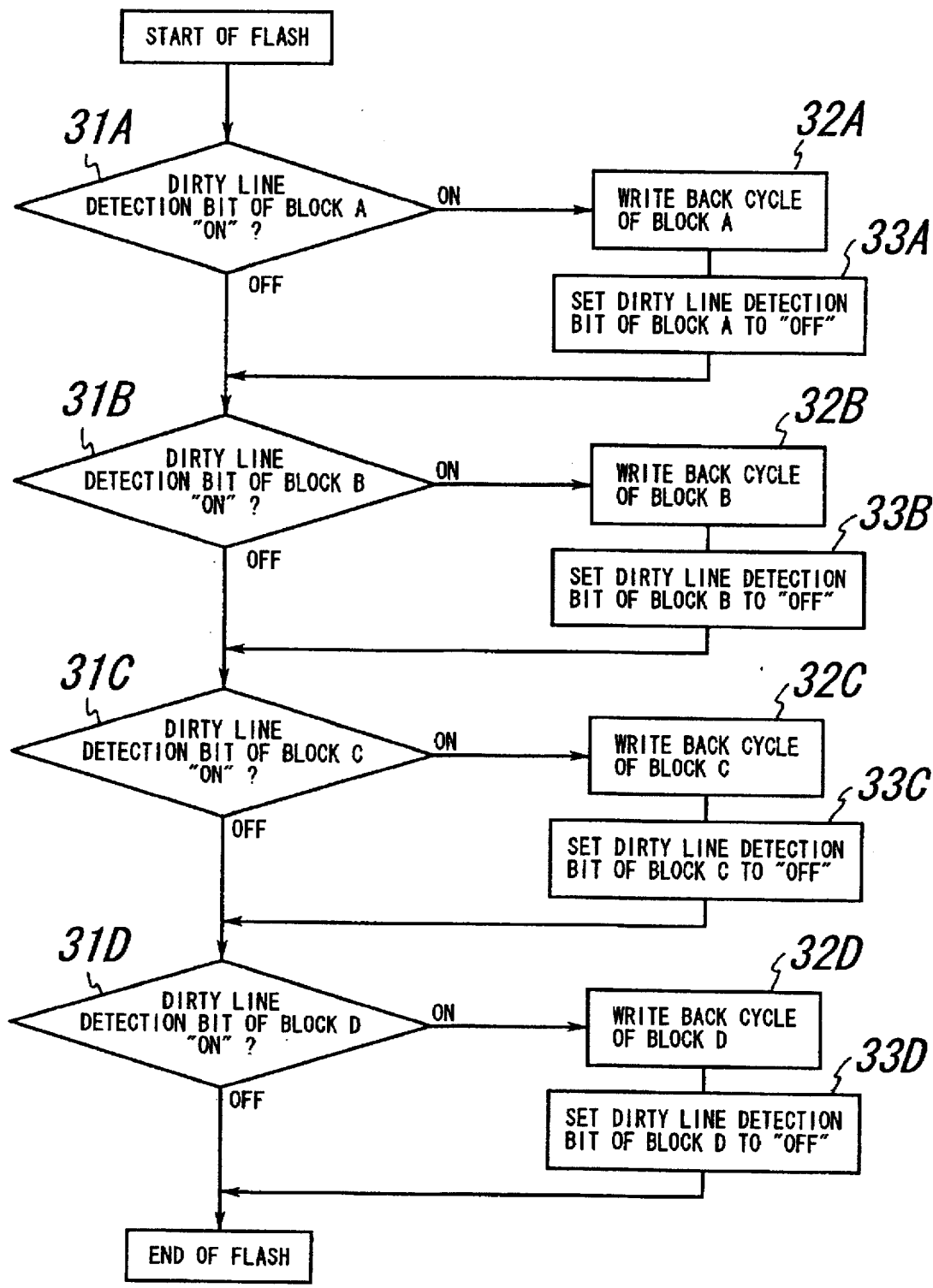
FIG. 3 is a flow chart illustrating flash cycle processing when the cache flash controlling method according to the present Invention is applied as illustrated in FIG. 2.

FIG. 3 illustrates flash cycle processing in this Instance. Referring to FIG. 3, the cache controller 10 discriminates, at steps 31A, 31B, 31C and 31D, in order of the blocks, whether or not the dirty line detection bit 23 set in the dirty line detection bit setting section 15 is "on". For each block with which the dirty line detection bit 23 is "on", flush cycles are performed for the lines included In the block as seen at steps 32A, 32B, 32C and 32D, and then, the dirty line detection bit 23 of the block is changed to "off" as seen at steps 33A, 33B, 33C and 33D. However, for any block with which the dirty line detection bit 23 is "off", the processing at such steps is omitted.

Particularly with regard to the example illustrated in FIG. 2, the lines at the tag addresses of the blocks A, B and C are all clean lines 16, and the dirty line detection bits 23 are all "off". Consequently, there is no need of performing discrimination of a dirty line for the tag addresses in the blocks A, B and C, and all lines of the blocks A, B and C can be invalidated immediately.

However, the block D includes a dirty line 17, and the dirty line detection bit 28 of the block D is "on". In this instance, since at which tag address or addresses a dirty line 17 is present and at which tag addresses a clean line 16 is present cannot be discriminated, in order to sequentially search all tag addresses in the block D, the control sequence advances to write back cycle processing at step 88D. Details of the write back cycle processing are illustrated in FIG. 4.

Figure 4:
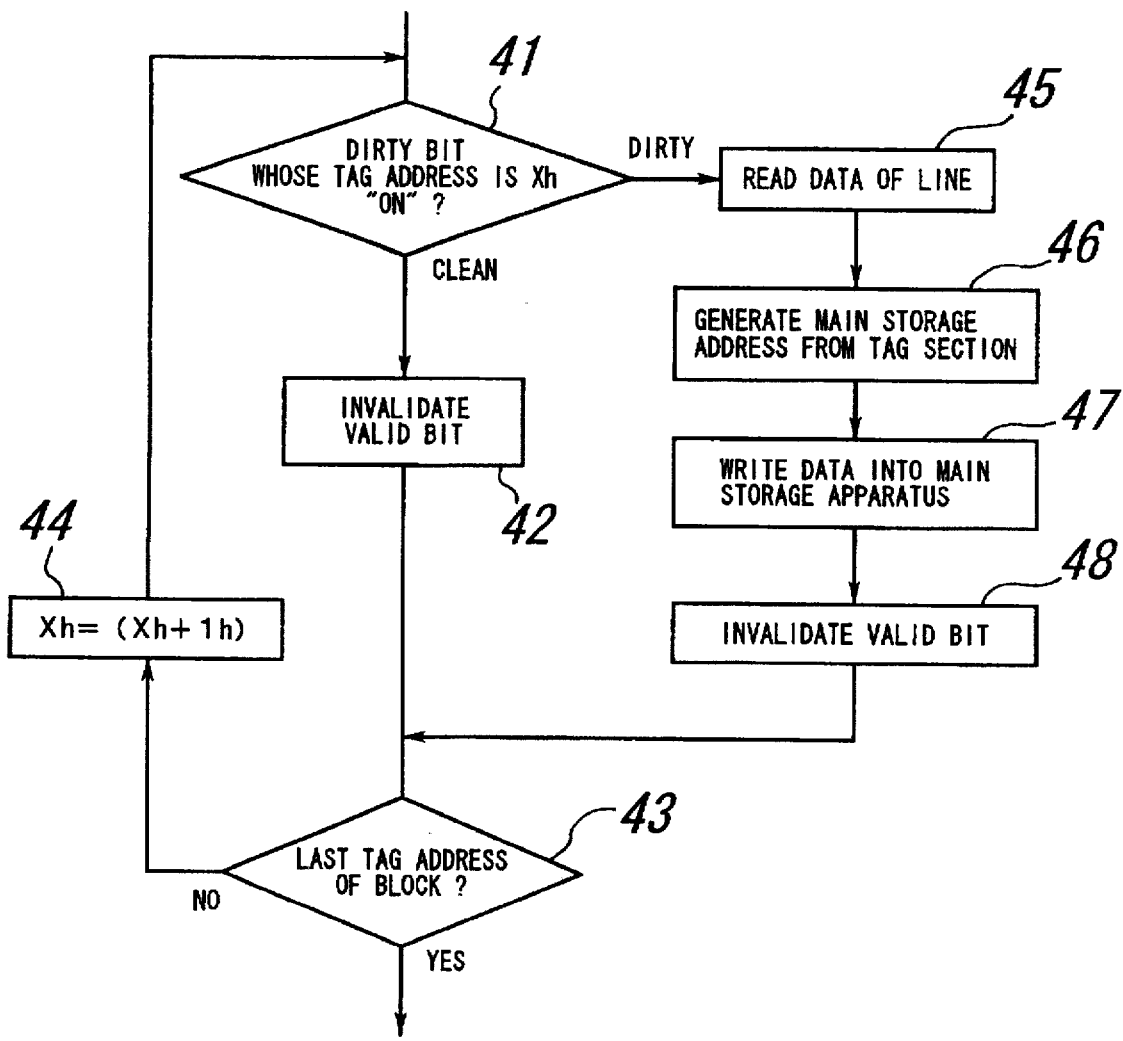
FIG. 4 is a flow chart illustrating details of write back cycle processing in the flow chart of FIG. 3.
Figure 5:
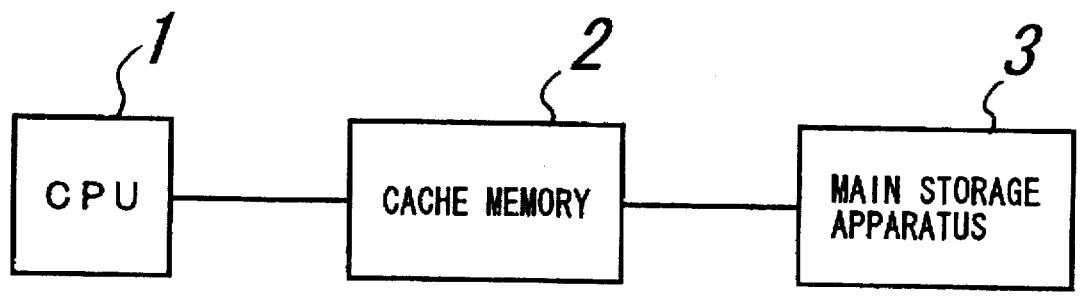
FIG. 5 is a block diagram showing an outline of a conventional cache memory system.
Figure 6:
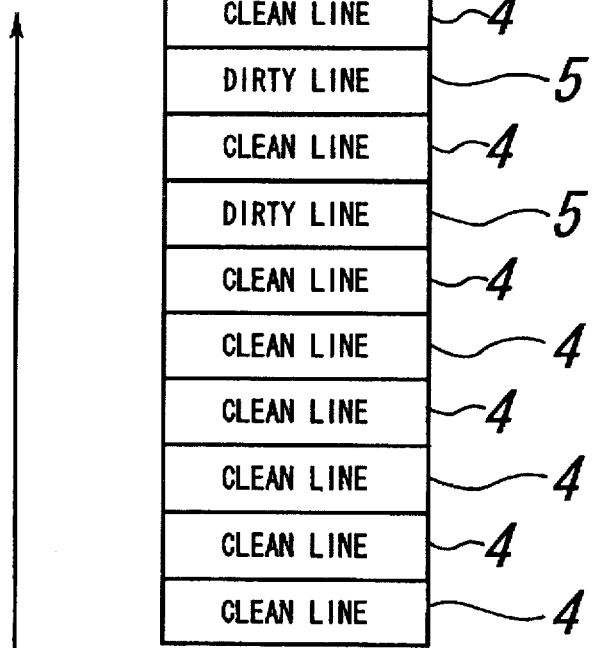
FIG. 6 is a diagrammatic view illustrating a conventional cache flash controlling method.
Figure 6:
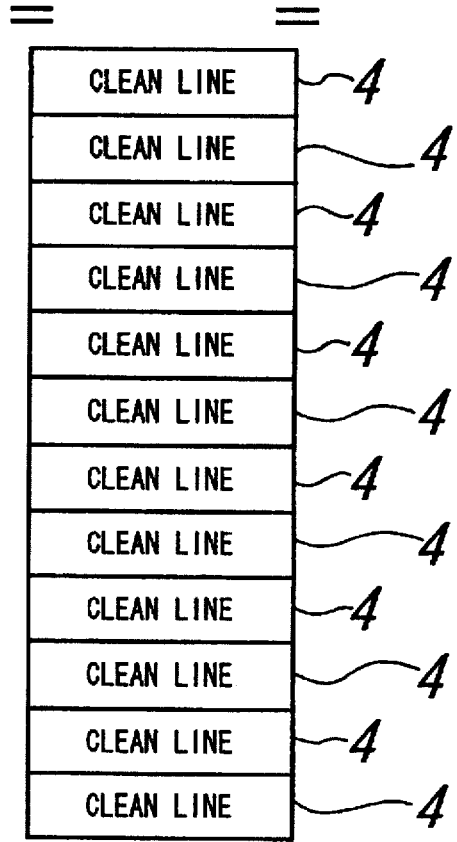

Referring to FIG. 4, it is discriminated at step 41 whether or not the dirty bit 24 of a line whose tag address is Xh is "on". If the dirty bit 24 is "off", that is, if the line of the tag address is a clean line, then the VALID bit is invalidated at step 42, and then it is discriminated at step 44 whether or not the tag address is the last tag address of the block. If the tag address is not the last tag address, the line to be searched is advanced to a next line at step 44, whereafter the control sequence returns to step 41. If the dirty bit 24 is "on", that is, if the line is a dirty line at step 41, then data at the line are read out at step 45, and a relevant main storage address 21 is generated from the tag section 13 at step 46. Then, the data read out are written into the main storage apparatus 12 at step 47, and the VALID bit is invalidated at step 48, whereafter the control sequence advances to step 43.

Accordingly, when the line is a clean line 16, stored contents of the line are invalidated Immediately, but when the line Is a dirty line 17, stored contents of the line are invalidated after they are written back into the main storage apparatus 12 from the line. In this manner, with regard to a block whose dirty line detection bit 23 is "on", since all tag addresses in the block are discriminated sequentially, similar control to that of the conventional cache flash controlling method described above is performed.

Having now fully described the invention, it will be apparent to one of ordinary skill in the art that many changes and modifications can be made thereto without departing from the spirit and scope of the invention as set forth herein.

What is claimed is:

1. A cache flash controlling method for a cache memory system of he write back type, comprising the steps of:

dividing lines having tag addresses in a cache memory into a plurality of blocks;

setting, for each block of the blocks, a dirty detection bit indicating whether or not a dirty line is present in the block;

discriminating, in a flash cycle, a condition of the dirty detection bit for each block of the blocks;

flashing, when the discriminating step provides a discriminated condition of the dirty detection bit of a block indicating absence of a dirty line the block without performing detection of a dirty line from within lines of the block;

detecting, when the discriminating step provides a discriminated condition of the dirty detection bit of a block indicating presence of a dirty line, the dirty line from within lines of the block;

writing data of the dirty line detected by the detecting step back into a main storage apparatus; and flashing the block having the dirty line detected by the detecting step.

* * * * *